Feb. 10, 1942.   G. P. BOSOMWORTH   2,272,893
TIRE INSPECTION APPARATUS
Filed July 25, 1939   6 Sheets-Sheet 1

INVENTOR
George P. Bosomworth
BY
ATTORNEYS

Feb. 10, 1942. G. P. BOSOMWORTH 2,272,893
TIRE INSPECTION APPARATUS
Filed July 25, 1939 6 Sheets-Sheet 2

INVENTOR
George P. Bosomworth
BY
ATTORNEYS

Feb. 10, 1942.   G. P. BOSOMWORTH   2,272,893
TIRE INSPECTION APPARATUS
Filed July 25, 1939   6 Sheets-Sheet 3
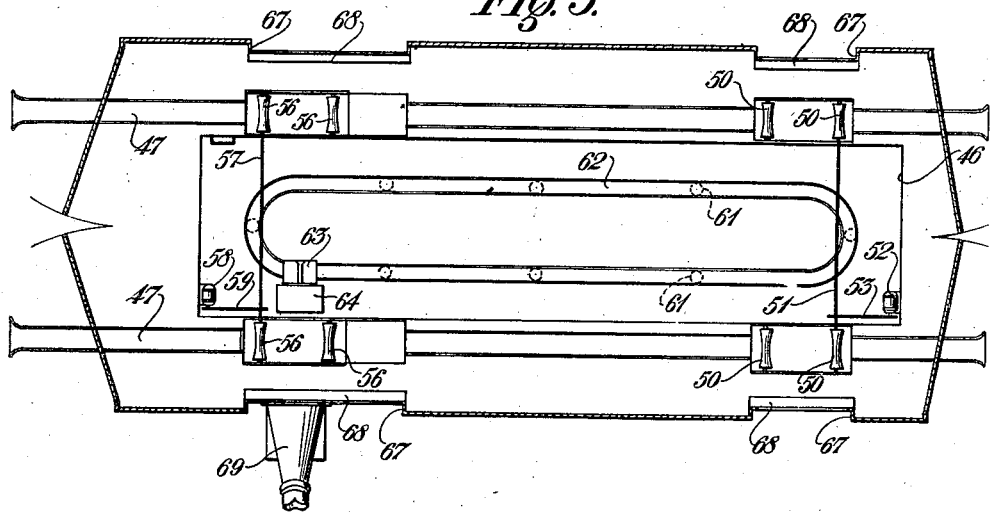
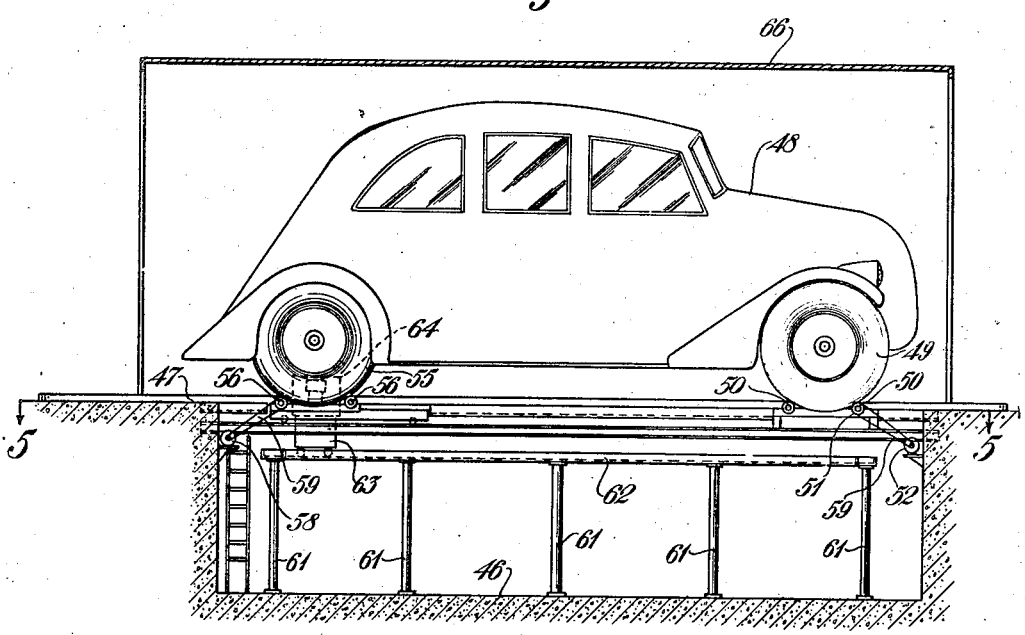
INVENTOR
George P. Bosomworth
BY
Ely & Frye
ATTORNEYS Feb. 10, 1942. G. P. BOSOMWORTH 2,272,893
TIRE INSPECTION APPARATUS
Filed July 25, 1939 6 Sheets-Sheet 4
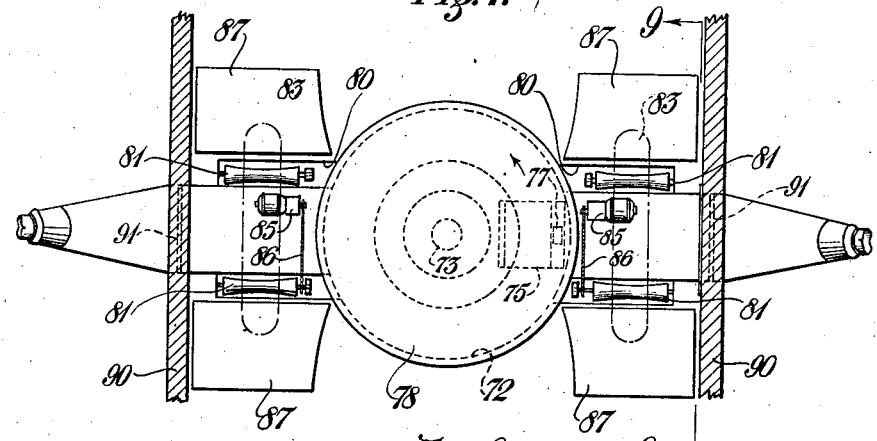
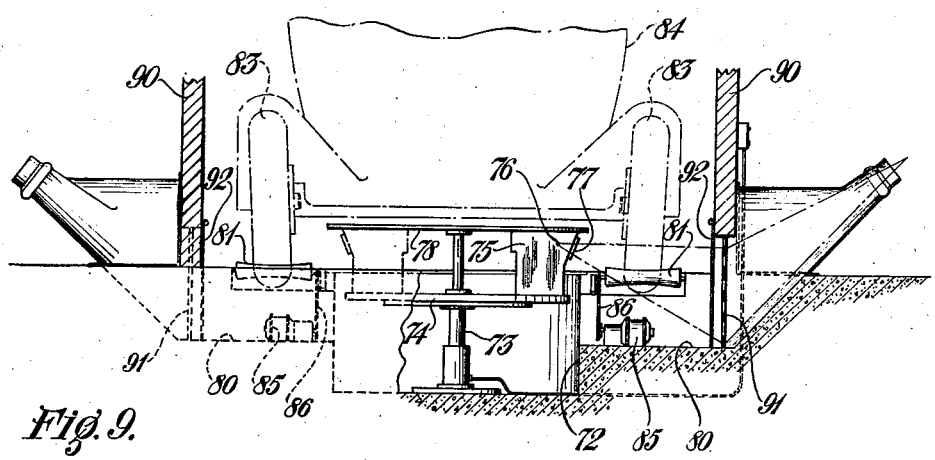
INVENTOR
George P. Bosomworth
BY
ATTORNEYS Feb. 10, 1942.  G. P. BOSOMWORTH  2,272,893
TIRE INSPECTION APPARATUS
Filed July 25, 1939  6 Sheets-Sheet 5

INVENTOR
George P. Bosomworth
BY
Ely & Frye
ATTORNEYS

Feb. 10, 1942.   G. P. BOSOMWORTH   2,272,893
TIRE INSPECTION APPARATUS
Filed July 25, 1939      6 Sheets-Sheet 6

INVENTOR
George P. Bosomworth
BY
ATTORNEYS

Patented Feb. 10, 1942

2,272,893

UNITED STATES PATENT OFFICE 2,272,893

TIRE INSPECTION APPARATUS

George P. Bosomworth, Akron, Ohio, assignor to The Firestone Tire & Rubber Company, Akron, Ohio, a corporation of Ohio Application July 25, 1939, Serial No. 286,387

2 Claims. (Cl. 250—52)

This invention relates to apparatus for inspecting vehicle tires, and more especially it relates to apparatus for inspecting the internal structure of vehicle tires to determine the presence of foreign matter, such as tacks, nails or other metal, or stones or the like that may have penetrated the body thereof, or to discover breaks, injuries or other structural defects in the fabric carcass of pneumatic tire casings.

More particularly the invention relates to apparatus employing X-rays as a means for producing a visual image of the internal structure of a tire, and in some of its aspects is an improvement upon the subject matter of U. S. Patent No. 1,617,758, issued February 15, 1927, to H. C. Heynemann.

The chief objects of the invention are to provide apparatus of the character mentioned that may be utilized for inspecting vehicle tires without requiring that the latter be removed from a vehicle upon which they are being used; to provide adequate protection to operators who are making the inspection; and to provide improved means for marking a tire to indicate the location of foreign matter or other abnormal conditions. Other objects will be manifest as the specification proceeds.

Of the accompanying drawings:

Figure 5 is a plan view of another embodiment of the invention taken on the line 5—5 of Figure 6;

Figure 6 is a side elevation thereof, and a motor vehicle mounted thereon;

Figure 7 is a plan view of still another embodiment of the invention;

Figure 8 is a side elevation thereof;

Figure 9 is a section on the line 9—9 of Figure 7;

Figure 1:
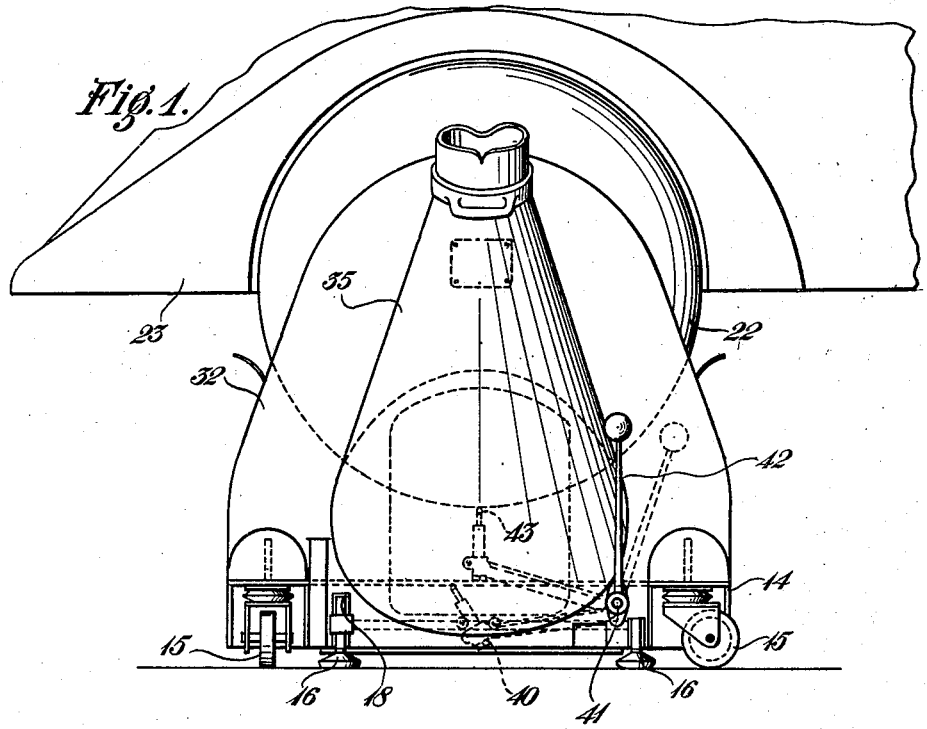
Figure 1 is a front elevation of apparatus constituting one embodiment of the invention.

Referring to Figures 1 to 4 of the drawings, there is shown a mobile apparatus comprising a platform 14 that is mounted upon a plurality of swivelled wheels or casters 15, 15 so as to be capable of being moved to desired positions, said platform having a central rectangular opening 21 in its surface at the front thereof. For holding the platform stationary while tire-inspections are being made, a pair of foot-like pads 16, 16 are provided, which pads are normally held in position above the floor by a tension spring 17, Figure 4, common to the two pads. A pedal-operated cam member 18 is provided for forcing the pads 16 downwardly into engagement with the floor to hold the platform 14 stationary in desired position. The arrangement is such that the inspection apparatus readily may be wheeled into proper position with relation to a tire on a motor vehicle after the latter is elevated to the desired position by means of a jack or similar apparatus. Such a tire is shown at 22, and a fragmentary portion of the vehicle is shown at 23. The tire may be rotated by means of a suitable stick or wand of sufficient length to enable the operator to remain at a safe distance from the X-rays while turning the tire.

Figure 4:
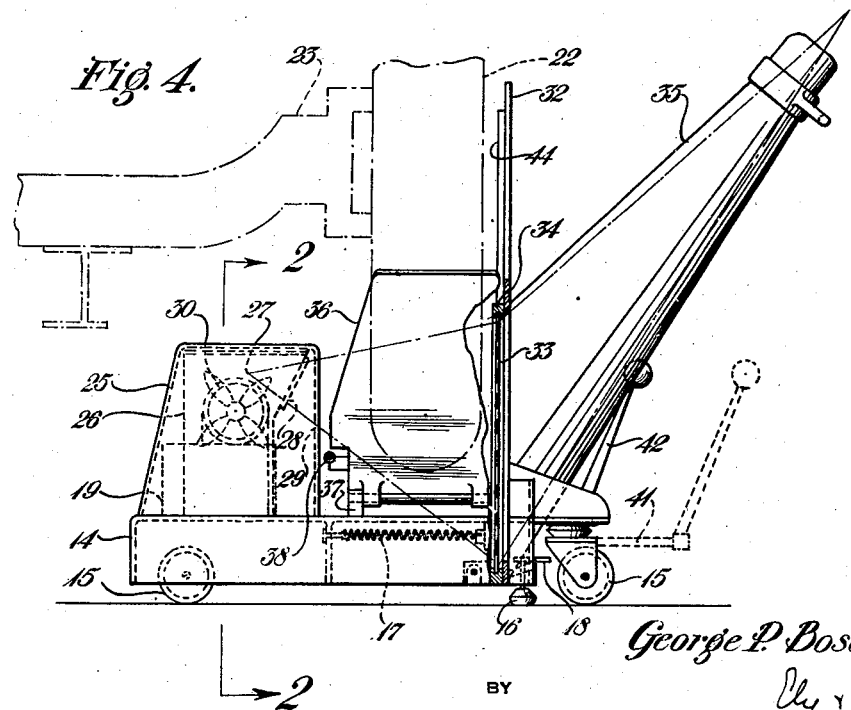
Figure 4 is a side elevation thereof as viewed from the left of Figure 1.
Figure 10:
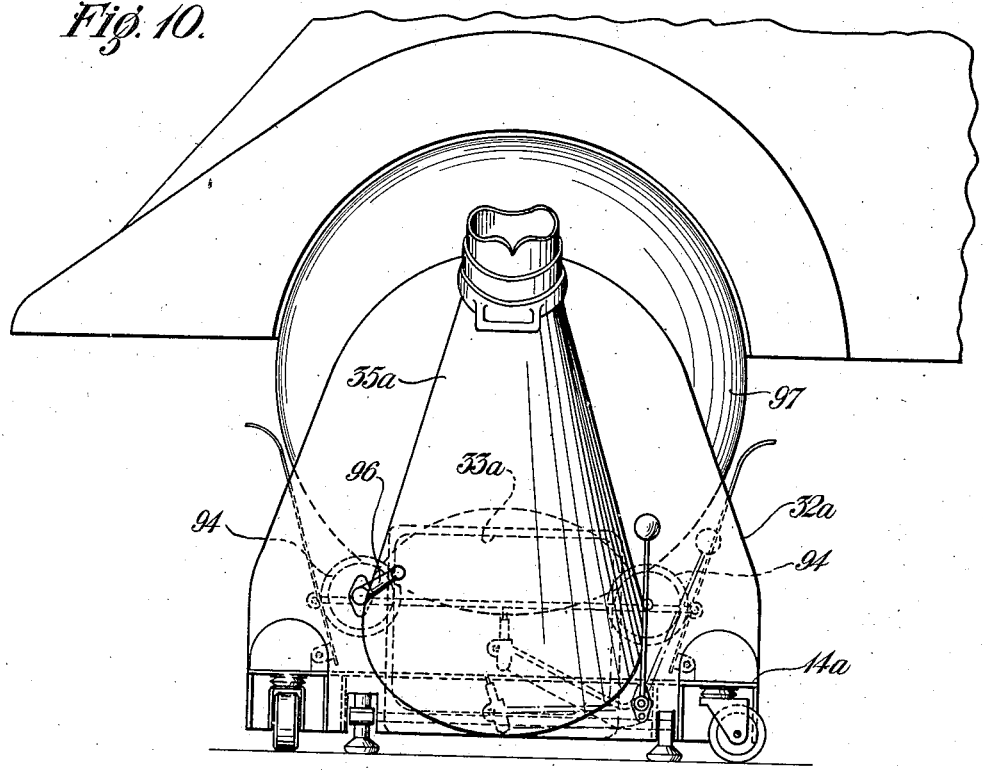
Figure 10 is a front elevation of apparatus constituting another embodiment of the invention.
Figure 11:
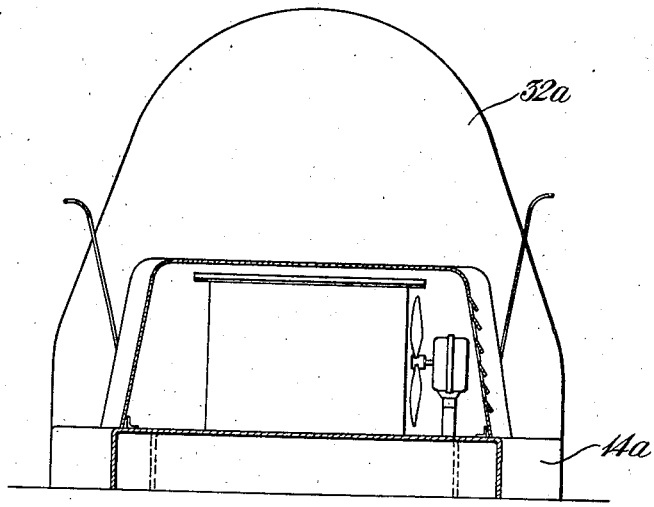
Figure 11 is a section thereof similar to Figure 2 of a previously described embodiment.
Figure 12:
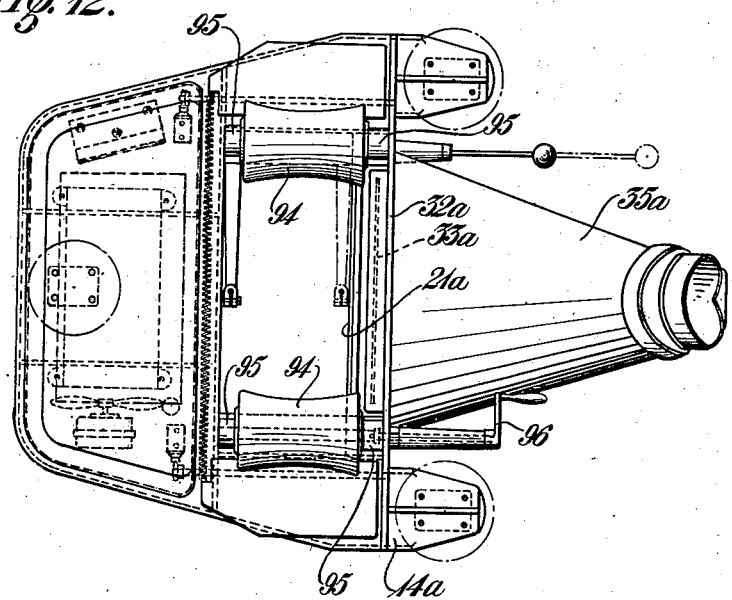
Figure 12 is a plan view of the apparatus shown in Figure 10.
Figure 13:
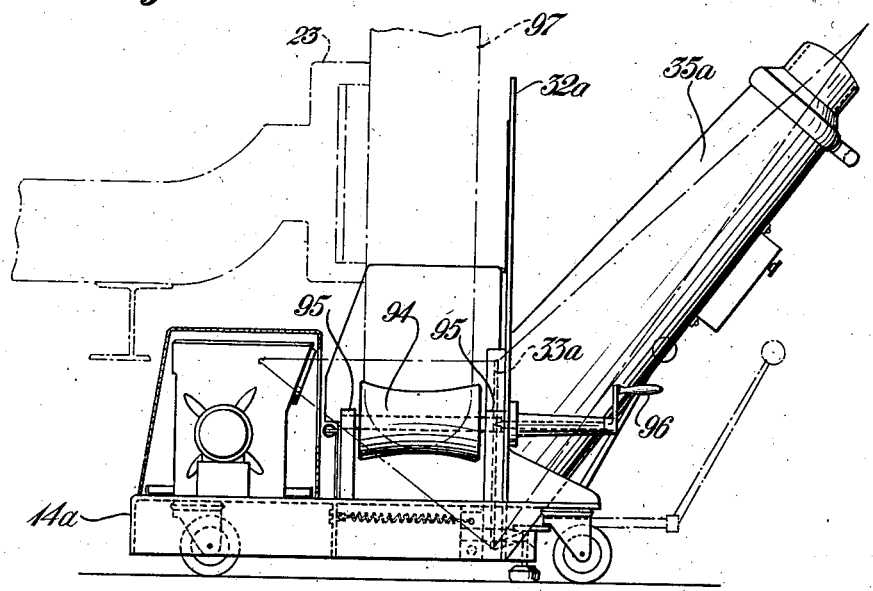
Figure 13 is a side elevation thereof as viewed from the left of Figure 10.

Mounted upon the top of platform 14, at the rear thereof, is a housing 25 within which is mounted a lead-lined box 26 containing an X-ray tube (not shown) of the usual oil-immersed type, the focal point of the X-ray tube being indicated at 27, Figure 4. There is a restricted opening at 28 in the front of box 26 and a somewhat larger opening 29, Figure 4, in the front of housing 25, said openings enabling the X-rays from the tube to impinge upon the tire 22. To assist in cooling the X-ray tube, an electrically driven blower fan 30 is mounted within the housing 25 in position to direct a current of air against the box 26, the housing 25 being formed with louvers 31 to admit air thereto. Also mounted within the housing 25, beneath the fan 30, is a stabilizer 19, which if desired may be of the transformer type, said stabilizer preventing overload of the X-ray tube. Also mounted within the housing 25, at the opposite end thereof from the stabilizer 19, is a distributor panel 20 upon which is mounted other accessories for the operation of the X-ray tube, such as fuses, milliammeter and rheostat, and switches, such accessories being standard equipment and not requiring detail illustration or description herein.

As is best shown in Figure 4, the focal point of the X-ray tube is not exactly opposite the side of the tire 22 but at a somewhat elevated position, and the opening 28 in the box 26 is so arranged that most of the X-rays are downwardly inclined or tilted from said focal point, the arrangement being such that the rays pass angularly through the tread portion of the tire.

On the opposite side of the tire 22 from the X-ray mechanism described is a relatively large protective apron or plate 32 of lead-coated steel, said plate being mounted upon the front margin of the platform 14. At its lower margin the plate 32 is cut away to receive a fluoroscopic screen 33 that is mounted in a suitable frame 34, said screen being so positioned as to receive the shadow or image of the tire produced by the X-rays from the X-ray tube in box 26. Secured to the front of plate 32 is a visor 35 of conoidal shape, the large end of the visor circumscribing the screen 33, the small end of the visor comprising a suitable aperture through which the image on the screen may be viewed. Secured to the back of plate 32 is a reservoir 44 for oil that is utilized to cool the X-ray tube, there being a pipe line 45 from said reservoir to the X-ray mechanism.

Figure 2:
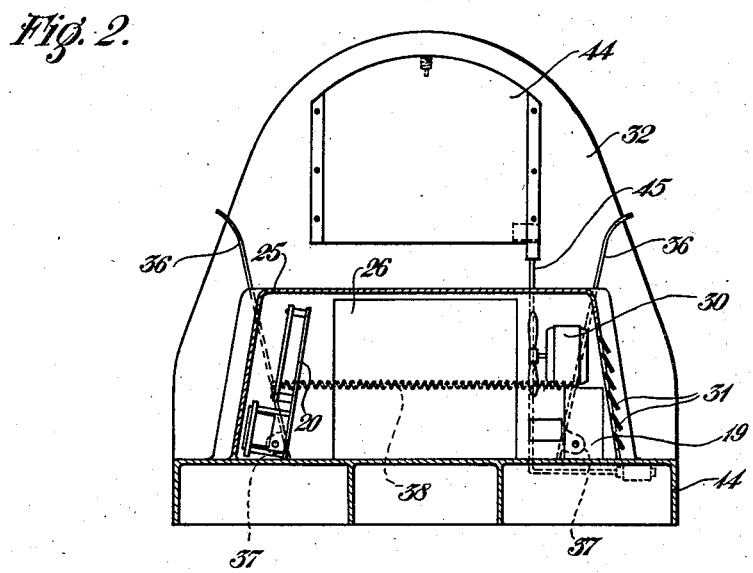
Figure 2 is a section on the line 2—2 of Figure 4.

As a further protection to the operator or others near the apparatus, a pair of pivotally mounted lead-coated plates 36, 36 are provided, which plates are disposed in the plane of the tire, between the housing 25 and the plate 32. Said plates are pivoted at their lower ends upon suitable brackets 37, 37 secured to the platform 14, and when in substantially upright position they are disposed adjacent the tire 22, fore and aft thereof. The plates 36 are connected to each other by a tension spring 38 that normally urges them toward each other when said spring is over center with relation to the pivot points of the plates in brackets 37, the movement of the plates toward each other being arrested by engagement of the plate-margins with the top of platform 14, at the pivoted end of the plates, as is best shown in Figure 2. The pivotal mounting of the plates 36 enables them to be tilted downwardly so as to facilitate the positioning of the apparatus in operative relation to a tire on a vehicle, and when in downwardly tilted position the plates serve to open respective cam-operated cut-out switches 100, 100 arranged in series in the electrical circuit of the X-ray mechanism, the arrangement being such as to prevent energising of the X-ray tube, except when the plates 36 are in elevated position.

Figure 3:
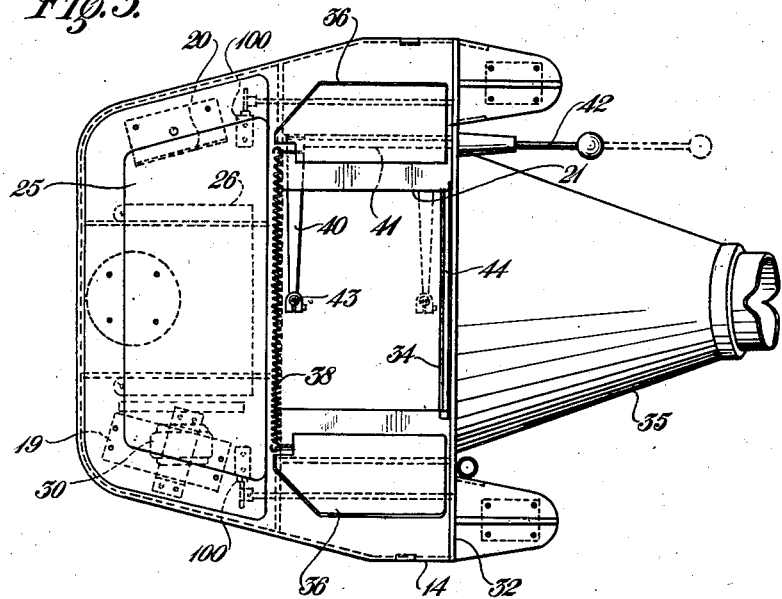
Figure 3 is a plan view of the apparatus shown in Figure 1.

The apparatus is provided with a manually operated marking device by which the location of hidden defects, as revealed by the X-rays, may be indicated on the tire. Said marking device comprises an arm 40 that is disposed below the opening 21 in the platform, and is supported at one end upon a suitably journaled, axially and angularly movable rod 41, the latter being disposed below the surface of the platform at one side of opening 21 and provided at its forward end with an operating lever 42 by which it may be moved axially or rocked angularly. The arm 40 extends laterally from the rod 41, its free end being disposed substantially in the same vertical plane as the axis of the tire 22, and provided with a suitable marking substance 43 such as chalk or crayon. In Figure 1 the arm 40 is shown in two alternative angular positions, and in Figure 3 is shown in two alternative lateral positions.

In the operation of the apparatus described, a vehicle having thereon pneumatic tires to be inspected is elevated at one end by means of a jack or the like, and the inspection apparatus is moved under one of the tires thereof to a position where the lowest part of the tire is directly between the X-ray tube and the screen 33. The protective plates 36, which have been lowered during the foregoing operation are then turned upward to the position shown in Figure 1. The X-ray tube is then energised from any suitable source of electricity (not shown) in the usual manner, the X-ray emanations passing through the body of the tire obliquely and projecting the shadow or image thereof on the fluoroscopic screen 33. Thus an inspector gazing into the visor 35 at the small end thereof readily can detect the presence of any foreign substances within the structure of the tire. The tire 22 is caused to rotate slowly by an assistant who uses a non-metallic rod for the purpose and stands at a position out of range of the X-ray emanations. When a defect in the tire is discovered, the inspector marks the location thereof by means of the crayon 43 which he manipulates by means of the lever 42.

Ordinarily a single tire inspection can be made in from 1½ to 2 minutes. The X-ray tube should not remain energised for intervals of longer than two minutes, and should be allowed to cool for at least two minutes before again being energised. The two minute cooling interval may be advantageously utilized for moving the apparatus into operative position with relation to another tire on the vehicle.

The apparatus is so constructed as not to require a tire to be removed from a vehicle in order than an X-ray inspection may be made, thereby conserving time and labor. The apparatus is mobile so as to be available for use at any place where electric power is available, it is adequately shielded to provide protection to operators, and it achieves the other advantages set out in the foregoing statement of objects.

The embodiment of the invention shown in Figures 5 and 6 is known as the "drive-on" type, which differs from that previously described in that the vehicle does not require to be lifted from the ground while its tires are being inspected. The apparatus requires the use of a pit 46 which is similar to pits used for greasing purposes, and may, in fact, also be used for that purpose. Channel-like trackways 47, 47 extend along each side of the pit at ground level for receiving the tires of a vehicle to guide the latter accurately to position over the pit. In Figure 6 is shown a vehicle 48 in position for inspection of its tires. When so positioned the front tires 49 of the vehicle rest upon respective pairs of grooved rollers or spools 50, 50, which spools are mounted in gaps in the respective trackways 47 on axes disposed transversely of said trackways. The spools 50 on one side of pit 46 are in axial alignment with the spools on the opposite side thereof, and two of said aligned spools are mounted upon a common rotatable shaft 51 that spans the pit. The shaft 51 is rotated by means of a motor 52 that is mounted in the pit and connected to said shaft by a transmission belt or chain 53, the arrangement being such that the one spool 50 of each pair of spools may be driven slowly by means of the motor 52 and thereby to effect the rotation of the two front wheels and tires 49 of the vehicle 48. In like manner the rear wheels 55 of the vehicle are adapted to rest upon respective pairs of spools or rollers 56, 56, the rear spools of the respective pairs of spools being mounted upon a common shaft 57 that spans the pit and is driven by a motor 58 to which it is connected by means of a transmission belt or chain 59. The pairs of spools 56 have limited adjustability longitudinally of the trackways 47 to adapt the apparatus to vehicles of different wheel base lengths.

Mounted within the pit 46 upon upright posts or standards 61, 61 is an endless trackway 62 of elliptical shape. Mounted upon said trackway 62 is a wheeled carriage 63, and mounted upon the latter is a lead-lined box 64 that encloses an X-ray tube (not shown) that is similar to that employed in the previously described embodiment of the invention. The carriage 63 is movable along the trackway 62 so as to position the X-ray tube behind the respective tires of the vehicle 48, the carriage being motor driven or cable propelled as desired.

Over the pit 46 and trackways 47 is a housing structure 66 of sufficient size to enclose the vehicle 48, said housing structure having doors at one or both ends thereof to provide ingress and egress for the vehicle. The housing structure 66 is lined with lead to prevent the radiation of X-rays therefrom. The respective sides of the housing 66 are formed with embrasures 67, 67 located opposite the tires of the vehicle when the latter is supported upon the spools 50 and 56, and mounted in said embrasures are respective screen frames 68 that support the usual fluoroscopic screens (not shown). The arrangement is such that when the X-ray tube is positioned behind a tire and energised, the shadow or image of the tire will be projected onto a fluoroscopic screen. For the better viewing of such an image, a portable visor 69 is provided, which visor may be placed in front of the respective fluoroscopic screens alternatively as the carriage 63 is moved to operative positions behind the various tires of the vehicle The visor 69 is essentially of the same construction as the visor 35 previously described so that a detail description thereof is not required.

This embodiment of the invention accomplishes the same purpose as that previously described, but is a more or less permanent installation and utilizes a greasing pit with which most garages and service stations already are provided.

The embodiment of the invention shown in Figures 7 to 9 also is a permanent installation designed for use in garages and the like. It comprises a pit 72 that is suitably positioned in the middle of a driveway for motor vehicles. Mounted in said pit is a hydraulic lift 73 carrying a rotatable circular turntable 74 thereon, and mounted upon the top of the latter is a lead-lined box 75 in which is mounted an X-ray tube (not shown), the focal point of said tube being indicated at 76. The box 75 has a restricted opening 77 in the outwardly facing wall thereof to enable the passage of X-rays therethrough, the opening being so arranged that the X-ray beam is directed obliquely downwardly. The turntable 74 also carries a cover plate 78 that extends over the box 75, the arrangement being such that when the hydraulic lift 73 is in lowered position the cover plate 78 is flush with the floor and so conceals and protects the X-ray apparatus on the turntable.

At diametrically opposite points with relation to the pit 72 are shallower pits 80, 80, and suitably mounted in each pit are two parallel, spaced-apart grooved rollers or spools 81, 81. The spools 81 are located in the top of pits 80, substantially flush with the ground level, the arrangement being such that each pair of spools is adapted to receive and support a vehicle tire 83 while the latter is on a vehicle, such as indicated at 84. One of the spools 81 in each pit 80 is driven so as to rotate a tire 83 thereon, and for rotating each of said spools, an electrically driven motor 85 provided with suitable reduction gear mechanism is mounted in each pit and connected to the spool 81 by a transmission belt or chain 86. Protective lead-coated metal plates 87, 87 are hingedly mounted at each side of each pit 80, said plates being positionable over the pit to conceal and protect the contents thereof, and being alternatively positionable in substantially upright position, at fore and aft positions with relation to a tire 83 being inspected, as shown in Figure 9, to constitute shields against X-ray emanations.

Respective parallel protective walls 90, 90 of lead-coated material are positioned on opposite sides of the driveway and span the respective pits 80 laterally of the spools 81. The walls 90 are indented above each of said pits, and respective fluoroscopic screens 91 are mounted in said pits extending from the bottom thereof to the top of the indentures in the wall 90. Each screen 91 is so positioned as to receive the shadow or image of a tire 83 projected thereon by the X-rays from the box 75, when the latter is positioned adjacent that particular screen. Vertically slidable panels 92 may be provided for protecting the respective screens 91 when the latter are not in use. Outwardly of the walls 90 the pits 80 slope upwardly to ground level, said sloped portions of the pits accommodating respective visors 93 of conoidal shape, that are secured at their larger ends to the outer face of the walls 90. The small end of each visor is open to enable the image on the screen 91 to be viewed therethrough.

In this embodiment of the invention a vehicle is driven into operative position with relation to the apparatus, the front tires of the vehicle resting upon the spools 81. The X-ray tube is then energised and the tire adjacent said tube is inspected while the tire is slowly rotated by means of motor 85. Thereafter the turntable is rotated through 180° and a similar inspection made of the other front tire. Thereafter the vehicle is driven forwardly until its rear tires are properly positioned for inspection purposes, and the previously described inspection operations repeated. This completes the cycle of operations.

The embodiment of the invention shown in Figures 10 to 13 of the drawings is essentially similar to that shown in Figures 1 to 4, but in addition thereto includes means for supporting a wheel tire to be inspected in determinate position within the apparatus. Said means comprises a pair of laterally spaced apart grooved spools 94, 94 that are arranged on parallel horizontal axes and journaled in suitable bearing brackets 95, 95 rising from the top of platform 14a, at opposite sides of the opening 21a in the latter. The shaft of one of the spools 94 extends forwardly through the protective plate 32a, and has its end portion provided with a hand crank 96 by which the spool 94 may be rotated. Rotation of a spool 94 will effect rotation of tire 97 resting thereon for inspection, and the hand crank 96 is conveniently positioned to be rotated by an inspector while gazing into the visor 35a. The spools 94 properly position the tire so that the downwardly inclined X-ray beam projects the shadow of the tire onto the fluorescent screen 33a, and the latter is of sufficient width to reveal the internal structure of the tire from one spool 94 to the other.

Due to the weight of the vehicle upon which the tire 97 is mounted, said tire is somewhat flexed or deformed by pressure against the spools 94 with the result that rupture of cord strands and other defects of the tire carcass are more clearly revealed upon the screen 33a, thus making possible more efficient inspection.

Other modification may be resorted to without departing from the spirit of the invention or the scope thereof as defined by the appended claims.

What is claimed is:

1. In tire inspection apparatus, the combination of an X-ray tube and a fluoroscopic screen spaced apart from each other to admit a portion of a vehicle tire therebetween, a mobile platform supporting said X-ray tube and screen whereby the same may be moved into operative position with relation to a tire on a vehicle, and pivotally mounted protective plates swingable to operative positions fore and aft of the tire to afford protection against X-ray emanations, and movable to inoperative positions enabling them to pass under the tire when the platform is moved relatively of the tire.

2. A combination as defined in claim 1 including cut-out switches in the X-ray circuit and operatively associated with the respective protective plates, said switches being arranged in series and preventing operation of the X-rays when either plate is in inoperative position.

GEORGE P. BOSOMWORTH.